W. LEWIS.
MANUFACTURE OF SAW TEETH.
APPLICATION FILED MAY 31, 1913.
1,132,592.
Patented Mar. 23, 1915.
2 SHEETS—SHEET 1.
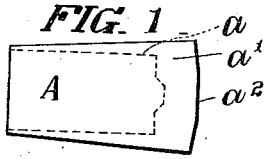
FIG. 1.
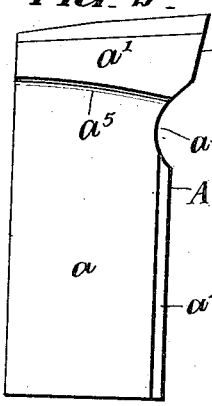
FIG. 2.
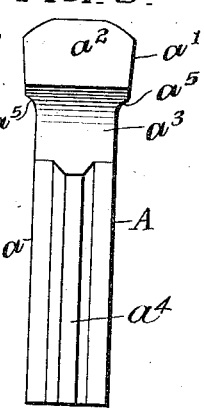
FIG. 3.
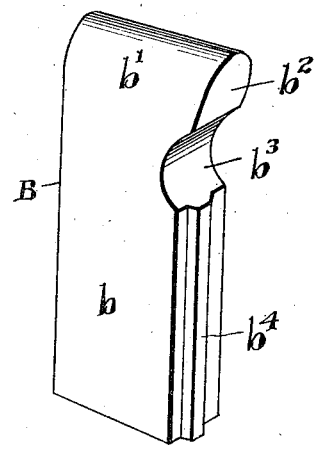
FIG. 4.
FIG. 5.
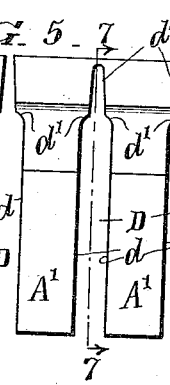
FIG. 6. FIG. 7.
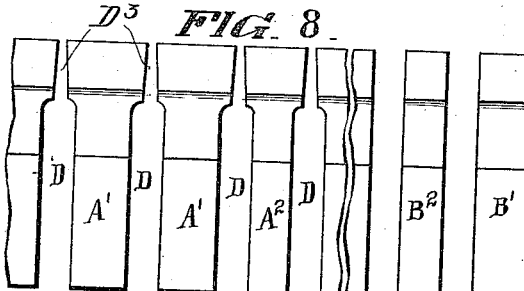
FIG. 8.
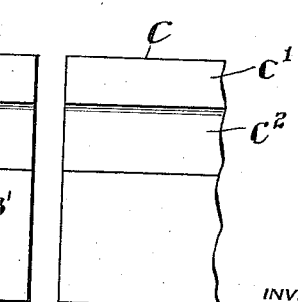
WITNESSES
INVENTOR
BY
ATTORNEY
THE NORRIS PETERS CO., PHOTO-LITHO., WASHINGTON, D. C.

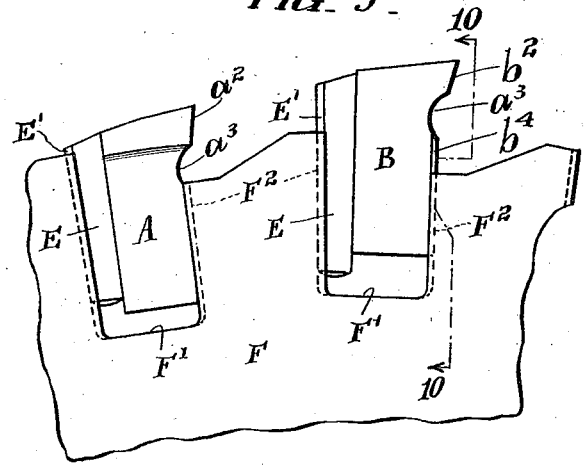
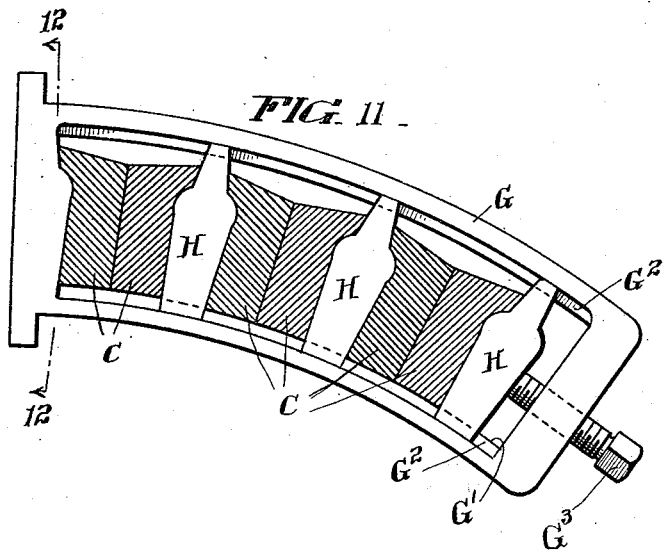
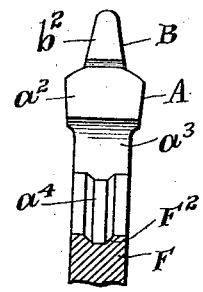
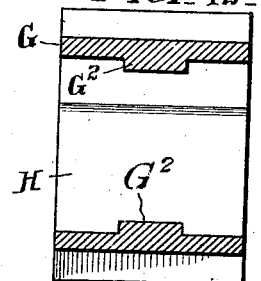

UNITED STATES PATENT OFFICE.

WILFRED LEWIS, OF PHILADELPHIA, PENNSYLVANIA.

MANUFACTURE OF SAW-TEETH.

1,132,592.   Specification of Letters Patent.   Patented Mar. 23, 1915.

Application filed May 31, 1913.   Serial No. 770,813.

*To all whom it may concern:*

Be it known that I, WILFRED LEWIS, a resident of the city and county of Philadelphia and State of Pennsylvania, have invented a new and useful Improvement in the Manufacture of Saw-Teeth, of which the following is an exact and true description, reference being had to the accompanying drawings, which form a part thereof.

My present invention relates to the manufacture of teeth adapted to be inserted in the blades or bodies of metal cutting saws and particularly to the manufacture of such saw teeth out of the materials commonly designated by the term "high speed tool steel."

The object of my invention is to cheapen the cost of production and to improve the quality of saw teeth of the kind referred to above.

My invention consists in part in a novel method of forming the teeth, which involves the formation of a bar of high speed tool steel rolled or otherwise wrought to give it a special shape, and cutting the teeth from this bar in the manner hereinafter described, and consists in part in the specially shaped bar which in transverse section approximates the shape of a longitudinal section of a tooth cut from the bar.

The various features of novelty which characterize my invention are pointed out with particularity in the claims annexed to and forming a part of this specification. For a better understanding of the invention, however, and the manner in which it is carried out and the advantages obtained by its use, reference should be had to the accompanying drawings and descriptive matter in which I have illustrated and described various embodiments of the invention.

Of the drawings, Figure 1 is a plan, Fig. 2, a side elevation, and Fig. 3, an end elevation of one form of saw tooth constructed in accordance with the present invention. Fig. 4 is a perspective view of a second form of saw tooth. Fig. 5 is an elevation of the specially shaped bar from which the teeth are cut, the bar being partly cut up into teeth. Fig. 6 is a section on the line 6—6 of Fig. 5. Fig. 7 is a section on the line 7—7 of Fig. 5. Fig. 8 is a view taken similarly to Fig. 5 illustrating how different sizes and styles of teeth may be cut from the same bar. Fig. 9 is a side elevation of a portion of a metal cutting saw having teeth such as are shown in Figs. 1 to 4 and adapted to be used in the formation of such teeth. Fig. 10 is a partial sectional elevation taken on the line 10—10 of Fig. 9. Fig. 11 is an end elevation of a portion of apparatus employed in cutting teeth, and Fig. 12 is a section on the line 12—12 of Fig. 11.

A saw tooth of the kind to which the invention pertains is formed with a head or cutting end which initially at least, is larger in cross section transverse to the length of the tooth than is the body of the tool. This enlargement is due in whole or in part to the projection of the cutting lip of the tooth in front of the front edge of the tooth shank or body. The heads of some teeth are also thicker than their shanks, measured in a direction transverse to the plane of the saw blade in which the teeth are to be mounted. The saw tooth A shown in Figs. 1, 2 and 3, is an instance of a saw tooth which has its head enlarged in two directions. The saw tooth B shown in Fig. 4 is an instance of a tooth which has its head enlarged only in the direction of the plane of the saw blade in which the tooth is to be inserted. The tooth A comprises a shank $a$ and a head or cutting end $a'$. The cutting lip surface $a^2$ of the tooth projects in front of and is of greater thickness than the shank. A groove $a^3$ transverse to the length of the tooth is formed in the front edge of the tooth adjacent the lip surface $a^2$. This groove increases the extent to which the tooth may be ground away, and provides clearance space for chips. $a^5$ represents curved shoulders connecting the sides of the shanks and head of the tooth A.

The tooth B differs from the tooth A primarily in the fact that its head $b'$ is no wider than the shank of the tooth. Corresponding parts of the teeth A and B are indicated by analogous reference symbols. The tooth B has no shoulders corresponding to the shoulders $a^5$. As shown the teeth A and B are each formed with a rib $a^4$ or $b^4$ as the case may be, at the front edge of the shank adapted to enter a groove in the side wall of the tooth receiving pocket formed in the saw blade in which it is mounted as shown in Figs. 9 and 10, wherein F represents the blade of a rotating metal cutting saw formed with tooth receiving pockets F'. Each pocket F' is formed with grooves $F^2$ at its side edges adapted to receive the ribs $a^4$ or $b^4$ of the corresponding tooth A or B, and a similar rib E' formed on the wedge E by which each tooth is secured in place. As shown in Figs. 9 and 10, the teeth A and B are arranged alternately, and the teeth B project radially outward beyond the teeth A so that the teeth B cut a narrow kerf which is widened by the teeth A.

In forming such teeth as shown in Figs. 1 to 4 in accordance with the present invention, I first produce a wrought bar C of the desired composition, and having a transverse section as shown in Fig. 6, corresponding to a section of the saw tooth to be formed from it taken parallel to the plane of the saw blade in which the tooth is to be mounted. This involves forming the body of the bar C of a thickness equal to the width of the tooth shank, including the ribs $a^4$ or $b^4$ and forming the bar C with a rib C' rising from one of the flat sides of the bar at one edge of the latter. Preferably also, the bar is formed with a groove $C^2$ at the inner side of the rib C'. Advantageously the edge $C^3$ of the rib C' is inclined slightly to the sides of the body portions of the bar to give approximately the lip angle desired and the ribbed edge $C^4$ of the bar is inclined from a perpendicular to the flat sides of the body of the bar to give approximately the desired clearance angle. The bar C is preferably rolled to give it the desired cross section, though it may be forged to shape.

To form teeth similar to the tooth A of Figs. 1, 2 and 3 from the bar C, I cut transverse kerfs D into the bar from its unribbed edge, each kerf having parallel sides $d$ which terminate adjacent the rib C' in curved shoulders $d'$ which coincide with the shoulders $a^5$ of the teeth A. I also form a narrow extension of each kerf D which extends into or through the ribbed portion of the bar C between the sides of the kerf D. As shown at the right hand side of Fig. 3, the narrow kerf extensions $d^2$ do not extend all the way through the ribbed portion of the bar C, so that the adjacent tooth blanks A' are connected by a web which may be readily broken as by means of wedges forced into the outer ends of the kerfs D; while the narrow kerf extensions $d^3$ at the left in Fig. 5 extend entirely through the ribbed portions of the bar to completely sever the tooth blanks $A^2$. When the tooth blanks are not entirely severed from the bar by extending the narrow kerfs clear through the ribbed portions of the bar, some difficulty which may otherwise be experienced in disposing of the tooth blanks at the time the kerfs are formed, is avoided. As shown the opposite sides of each kerf extensions $d^2$ and $d^3$ are slightly inclined to each other to provide approximately the clearance desired at the sides of the finished teeth. After the tooth blanks are thus cut from the bar each blank is machined to provide the rib $a^4$ and then either with or without a preliminary grinding or dressing of the cutting end of the blank, the blank is subjected to the characteristic heat treatment employed in hardening high speed tool steel. Thereafter the tooth is finished by grinding, if necessary to sharpen it, and to give the proper contour to the cutting edge. The teeth B are cut from the bar C by straight cuts through the bar as indicated at the right hand side of Fig. 8, wherein $D^3$ represents the kerfs by which the tooth blank B' and $B^2$ are cut from the bar. The tooth blanks B' and $B^2$ are thereafter finished by treating them in a manner analogous to that in which the blanks for the teeth A are finished.

It is one of the great advantages of my invention that teeth differing greatly in thickness, though otherwise similar in their general form, may be cut from a bar of uniform cross section. This means in practice that practically all sizes of teeth required for a complete line of ordinary metal cutting saws may be made from the same bar by merely varying the dimensions of the teeth measured parallel to the length of the bar from which they are cut, for in saws differing greatly in capacity, and in the thickness of kerf cut, the teeth may all be of the same length and width measured parallel to their planes of movement.

The manner in which teeth of different sizes may be cut from a single bar is illustrated by Fig. 8 wherein the tooth blanks A' differ from the tooth blanks $A^2$ merely in thickness of shank and a similar difference exists between the tooth blanks B' and $B^2$. It will be apparent of course that the relative thickness of head and shank of the teeth similar in shape to the tooth A may be varied by varying the relative thickness of the kerfs D and the narrow kerf extensions $d^2$ or $d^3$ as the case may be, whereby the teeth are cut from the bar C. The cutting up of the bar C into teeth may be carried out by the use of a metal cutting saw such as is shown in Figs. 3 and 4, in which case the teeth B of the saw may be employed to form the narrow extensions $d^2$ or $d^3$ of the kerfs D which are defined by the teeth A of the saw. The teeth may also be cut from the bar C by a milling cutter.

In Figs. 11 and 12 I have shown a form of holder G which I may employ for simultaneously cutting kerfs in a plurality of bars C by the same saw. The holder G is formed with an arc shaped slot G' having ribs $G^2$ at the inner sides of the slot. The ribs $G^2$ form guides for the slotted ends of spacers H, each of which is formed on its opposite sides to fit against the ribbed sides of the adjacent pair of bars C, two of these bars being placed with their flat sides together between each adjacent pair of spacing blocks H. Means such as the clamping screw G³ is provided for detachably clamping the assembled bars C and spacing blocks H together. In practice, I consider it desirable, if conditions permit, to have the radius of the saw cutting the teeth A, not greatly different from the radius of the saw in which the teeth are to be mounted, and to have the axis of the saw in proximity with the center of curvature of the slot G', so that the curved shoulders $a^5$ will be approximately parallel to the periphery of the saw in which the teeth are to be inserted.

Heretofore it has been the common practice to forge saw teeth of high speed tool steel. Owing to the character of such saw tooth material, the forging operation is a highly expensive one, largely because of the high temperature at which the teeth must be forged to avoid cracks and flaws. Even with the utmost care employed in their manufacture, it has been found that defects develop in a very considerable proportion of the saw teeth forged out of high speed tool steel, particularly in the smaller sizes of teeth. Such defects are particularly annoying and expensive from the fact that they do not become noticeable in many cases until after the teeth have been tempered and ground and put into service. Notwithstanding the amount of steel cut away in forming saw teeth in accordance with my present invention, the cost of the teeth is substantially less than the cost of teeth forged into shape, and with my invention the teeth formed are practically free from flaws or cracks which render a large proportion of forged teeth useless.

While in accordance with the provisions of the statutes I have illustrated and described the best forms of my invention now known to me, it will be apparent to those skilled in the art that changes may be made in the form of apparatus disclosed and that under some conditions certain features of the invention may be used to advantage without a corresponding use of other features.

Having now described my invention what I claim as new and desire to secure by Letters Patent is,

1. As a new article of manufacture, a wrought homogeneous bar of high speed steel generally rectangular in cross section and of greater width than thickness, and having a rib rising from one side of the bar at one edge thereof, the top surface of the rib being inclined toward the side of the bar from which the rib rises, whereby saw teeth having enlarged heads with their inclined cutting lip surfaces formed by the corresponding sections of the top edge of said rib may be obtained by transversely dividing said bar into sections.

2. As a new article of manufacture, a wrought homogeneous bar of high speed steel generally rectangular in cross section and of greater width than thickness, and having a rib rising from one side of the bar at one edge thereof, the top edge of the rib being inclined toward the side of the bar from which the rib rises, said bar having a longiturdinal groove formed in the side from which said rib rises adjacent the latter, whereby saw teeth having enlarged heads with their inclined cutting lip surfaces formed by the corresponding sections of the top of the edge of said rib and with groove receiving spaces formed by the corresponding sections of said groove may be obtained by transversely dividing said bar into sections.

3. The method of forming saw teeth each having a shank terminating at one end in an enlarged head of high speed tool steel which consists in forming a bar of said steel corresponding approximately in cross section to the section of tooth taken parallel to its plane of movement, cutting teeth from the bar by cuts transverse to the length of the bar, tempering the teeth thus cut from the bar and finishing the teeth by grinding.

4. The method of forming saw teeth, each comprising a shank terminating at one end in an enlarged head, which consists in forming a bar with a rib at one edge, cutting transverse kerfs in the bar which extend into the bar from its unribbed edge and have parallel sides terminating adjacent the ribbed edge of the bar, and sundering the ribbed edge of the bar between the parallel sides of each kerf.

5. The method of forming saw teeth, each comprising a shank terminating at one end in an enlarged head, which consists in forming a bar with a rib at one edge, cutting transverse kerfs in the bar which extend into the bar from its unribbed edge and have parallel sides terminating adjacent the ribbed edge of the bar, and cutting kerfs in the ribbed edge of the bar, each narrower than and forming an extension of a corresponding one of the first mentioned kerfs and lying between the parallel sides thereof.

6. The method of forming saw teeth each comprising a shank terminating at one end in an enlarged head, which consists in forming a bar with a rib at one edge, cutting transverse kerfs in the bar which extend into the bar from its unribbed edge and have parallel sides terminating adjacent the ribbed edge of the bar in curved surfaces with their concave sides toward the unribbed edge of the bar, and cutting kerfs in the ribbed edge of the bar each narrower than and forming an extension of a corresponding one of the first mentioned kerfs and intersecting the curved surfaces of said one kerf between the said parallel sides thereof.

7. The method of forming saw teeth each having a shank terminating at one end in an enlarged head of high speed tool steel which consists in forming a bar of said steel corresponding approximately in cross section to the section of tooth taken parallel to its plane of movement, and cutting teeth from the bar by cuts transverse to the length of the bar.

WILFRED LEWIS.

Witnesses:
H. C. McCaull, Jr.,
R. Raymond Porter.

Copies of this patent may be obtained for five cents each, by addressing the "Commissioner of Patents, Washington, D. C."